Figure 1:
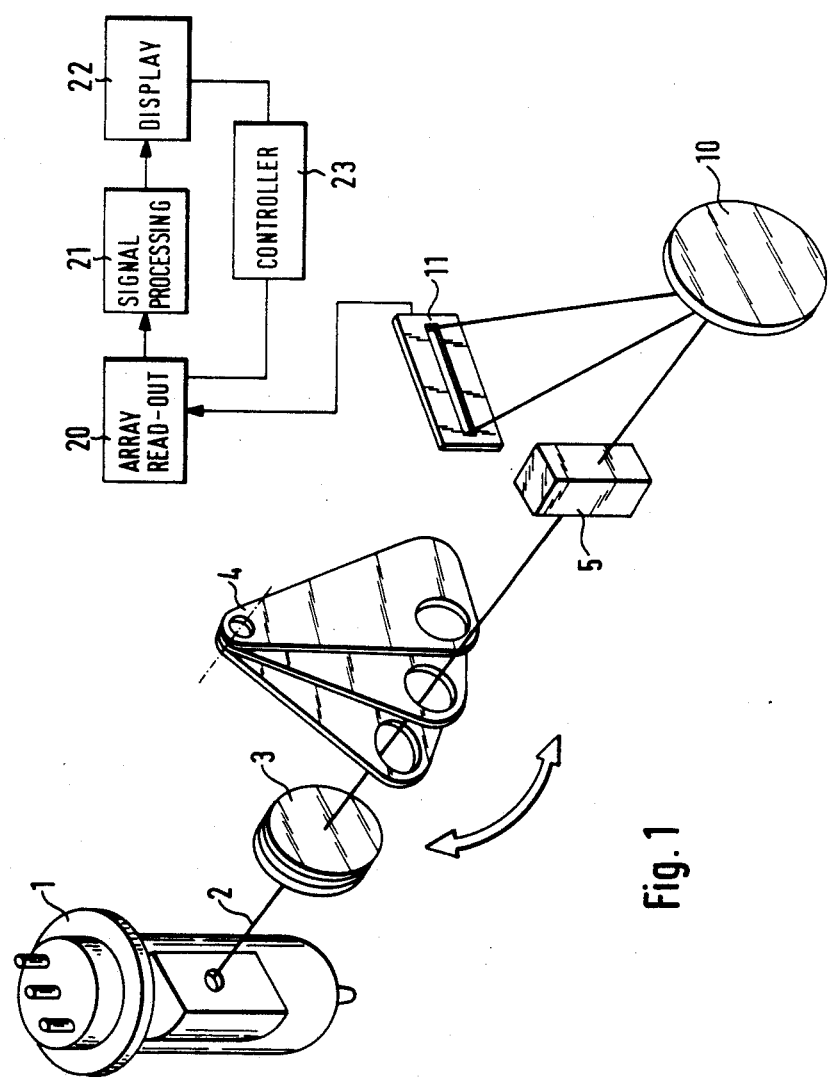

United States Patent [19]

Kuderer

[11] Patent Number: 4,958,928
[45] Date of Patent: Sep. 25, 1990

[54] PHOTODIODE ARRAY SPECTROMETER

[75] Inventor: Hubert Kuderer, Waldbronn, Fed. Rep. of Germany

[73] Assignee: Hewlett-Packard Company, Palo Alto, Calif.

[21] Appl. No.: 338,265

[22] Filed: Apr. 14, 1989

[30] Foreign Application Priority Data

Aug. 17, 1988 [EP] European Pat. Off. .......... 8811346.6

[51] Int. Cl.$^5$ ............................ G01J 3/18; G01J 3/42
[52] U.S. Cl. .................................................... 356/328
[58] Field of Search ......................... 356/308, 326, 328

[56] References Cited

U.S. PATENT DOCUMENTS 4,320,971 3/1982 Hashimoto et al. ................. 356/328

Primary Examiner—F. L. Evans

[57] ABSTRACT

A photodiode array spectrometer comprises an arry (40) of photosensitive elements for receiving a beam of light. Light impinging on a photodiode causes discharging of the associated capacitors. The capacitors are recharged periodically by a charge amplifier via a video line (30) by closing transfer switches (SW1, . . . , SW 768) associated with the photosensitive elements, repectively. The switches are group together in several segments which are independently addressable such that during a recharge scan only selected groups of photodiodes are recharged. The information which segments are to be sctivated, i.e. which groups of switches are to be closed, is contained in a segment control block (43). An integration control block (46) additionally permits to adjust the time intervals between successive recharge cycles separately for each selected segment. The invention permits to select regions of interest of the photodiode array for a specific application, whereas other regions are ignored for that application, leading to a reduced data rate with high spectral resolution and sensitivity.

8 Claims, 3 Drawing Sheets

PHOTODIODE ARRAY SPECTROMETER

The invention relates to a photodiode spectrometer. Such a spectrometer can be used, for example, for measuring the absorption spectrum of a sample substance in order to derive information about the chemical composition of the sample and the quantities of the individual constituents in the sample.

A photodiode array spectrometer according to the preamble of claim 1 is known from "A High-Speed Spectrophotometric LC Detector", Hewlett-Packard Journal, Apr. 1984. This known spectrometer is used in a liquid chromatograph for analysing the substances eluting from the chromatographic column. The known spectrometer comprises a light source emitting a broad spectrum of ultraviolet and visible radiation and an optical system for focusing the beam onto a sample cell through which the sample substances to be analysed flow. Depending on the specific substances flowing through the cell, the sample absorbs certain characteristic spectral portions of the radiation entering the sample cell so that the spectral composition of the radiation leaving the cell is indicative of the sample substances.

In the known spectrometer, the spectrum of the radiation leaving the sample cell is derived by means of a diffraction grating arranged in the optical path behind the cell. The diffraction grating directs light rays of different wavelengths into different directions. A linear array of photodiodes is arranged to receive the light diffracted by the grating. Each diode thus receives light corresponding to a different wavelength range. The electrical signals produced by the impinging light in each photodiode are read out by a read-out circuit and converted to digital data values which are representative of the intensity of the light impinging on the specific diode. These data values are then displayed as a function of wavelength in any convenient form, for example on a CRT screen.

The photodiode array is built on semiconductor material and comprises a plurality of photosensitive elements which are connected via electronic switches to a common output line (video line) which in turn is connected to a charge amplifier. Each photosensitive element has an associated capacitor which represents the junction capacitance of the photodiodes. The combination of photosensitive element and associated capacitor will subsequently also be referred to as "photocell". Light impinging on the photo-sensitive material generates charge carriers which discharge these capacitors. In operation, the capacitors of the photocells are initially charged to a fixed value, respectively, and then the whole array is scanned in predetermined intervals by sequentially closing the switches such that the photocells are recharged by the charge amplifier to their original charge level. The amount of charge transferred hereby causes a voltage change at the output of the charge amplifier which is proportional to the amount of light which has caused the discharge of the photocell.

Three important quantities for characterizing the performance of a spectrometer are spectral resolution, spectral range and sensitivity. Spectral resolution indicates how well radiation components with closely adjacent wavelengths are separated so that they can be identified as separate components. Spectral range indicates the interval of wavelengths which can be analysed by the spectrometer. Sensitivity indicates how well weak signals can be distinguished from background noise and corresponds to the signal/noise ratio. In spectrometers using photodiode arrays as light detecting element, the requirement of a wide spectral range at a given resolution leads to arrays with a large number of individual photodiodes, e.g. 1024 diodes as in the known spectrometer. Due to this large number of photodiodes, the known spectrometer produces a large number of data values per time unit, i.e. for each reading out of a photosensitive element during a scan, a new data value is obtained. Consequently, costly data processing and data storage circuits such as A/D converters, microprocessors, mass storage devices, are required.

The sensitivity of a spectrometer can generally be improved by increasing the power of the light source of the spectrometer. As a consequence thereof, the light power incident on the photodiodes also increases so that the capacitors associated with the photosensitive elements are discharged to a larger extent than in case of lower light power. Since the capacitors must not be completely discharged in order to avoid nonlinearities and since the size of the capacitors is limited by economic usage of the chip area of the photodiode array, the scan rate with which the capacitors are recharged has to be increased when the light power is increased. Consequently, the number of data values per time unit, i.e. the data rate, is increased unless the number of photocells is reduced which, however, would result in a smaller spectral range and/or resolution.

According to the foregoing considerations, known photodiode array spectrometers are not satisfactory in all respects because they require a compromise between spectral resolution, spectral range, sensitivity and data rate so that not all of these parameters can be simultaneously selected to the desired value in a specific application. Known photodiode array spectrometers therefore require comparatively high circuit expense if high performance of the spectrometer is desired.

Relative to the prior art, it is an object of the invention to provide a photodiode array spectrometer which permits increase of spectral resolution and sensitivity without substantially increasing the cost and complexity of the signal processing circuitry.

According to an underlying principle of the invention, the whole photodiode array is subdivided into segments which are selectably addressable such that only selected segments of the array are read out during a scan, whereas the remaining segments are skipped. The segment or segments of the array which are read out can be selected in accordance with the specific application, e.g., the wavelength range which is important for the identification and quantitative determination of the specific sample to be analyzed. Since only the photodiodes corresponding to the relevant spectral range or ranges are read out and the photodiodes of the remaining spectral range are skipped during a read-out scan, less data are produced within a certain time interval than in prior art photodiode arrays of comparable performance wherein during each scan all the photodiodes are read out. Thus, the data rate of the spectrometer is kept small. On the other hand, the spectrometer according to the invention can be used with a higher light power for improving sensitivity, and with a larger number of photodiodes per unit length for achieving higher spectral resolution without causing a higher data rate than in conventional photodiode array spectrometers. Since the spectrometer according to the invention may comprise a large number of photodiodes, it can cover a wide spectral range so that many different substances can be analysed which typically have their relevant spectral characteristics in different spectral ranges, but yet the data rate can be kept low because only the photodiodes relevant for the specific application are read out during the scans.

According to an embodiment of the invention, the duration of the time intervals during which the capacitors of the photocells of a specific segment are discharged (i.e., the integration times) can be individually adjusted. For example, the integration times in segments which have low spectral response, i.e., low incident light intensity, can be selected greater than in segments with higher spectral response so that the overall spectral response is smoothed. In that way, the dynamic range of the signals read out from the photodiode array can be reduced so that the requirements of the signal processing circuitry such as an A/D converter, in particular the resolution requirements thereof, are reduced. Furthermore, the signal/noise ratio can be improved by increasing the integration time because the strength of the measuring signal grows proportionally with the integration time, whereas the noise only grows according to the square root of the integration time resulting in an improvement of the signal/noise ratio according to the square root of the integration time. In summary, by increasing the integration times of segments having less spectral response than other segments, both the dynamic range of the whole spectrum can be smoothed and the signal to noise ratio can be improved.

Subsequently, an embodiment of the invention is explained in more detail with reference to the drawings.

FIG. 1 is a schematic diagram of a photodiode array spectrometer comprising a photodiode array according to the invention.

Figure 2:
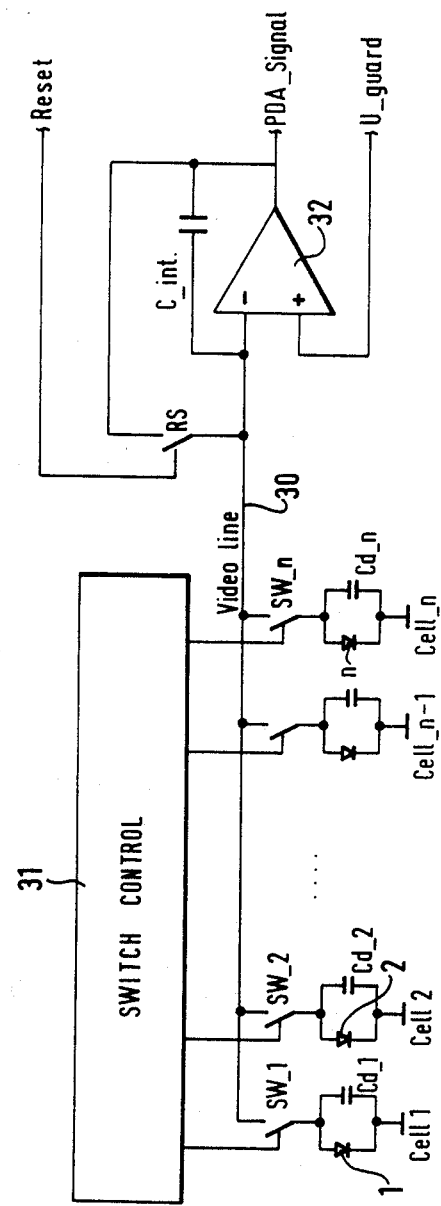

FIG. 2 schematically shows a photodiode array of the invention with the charge amplifier circuit for reading out the array.

Figure 3:
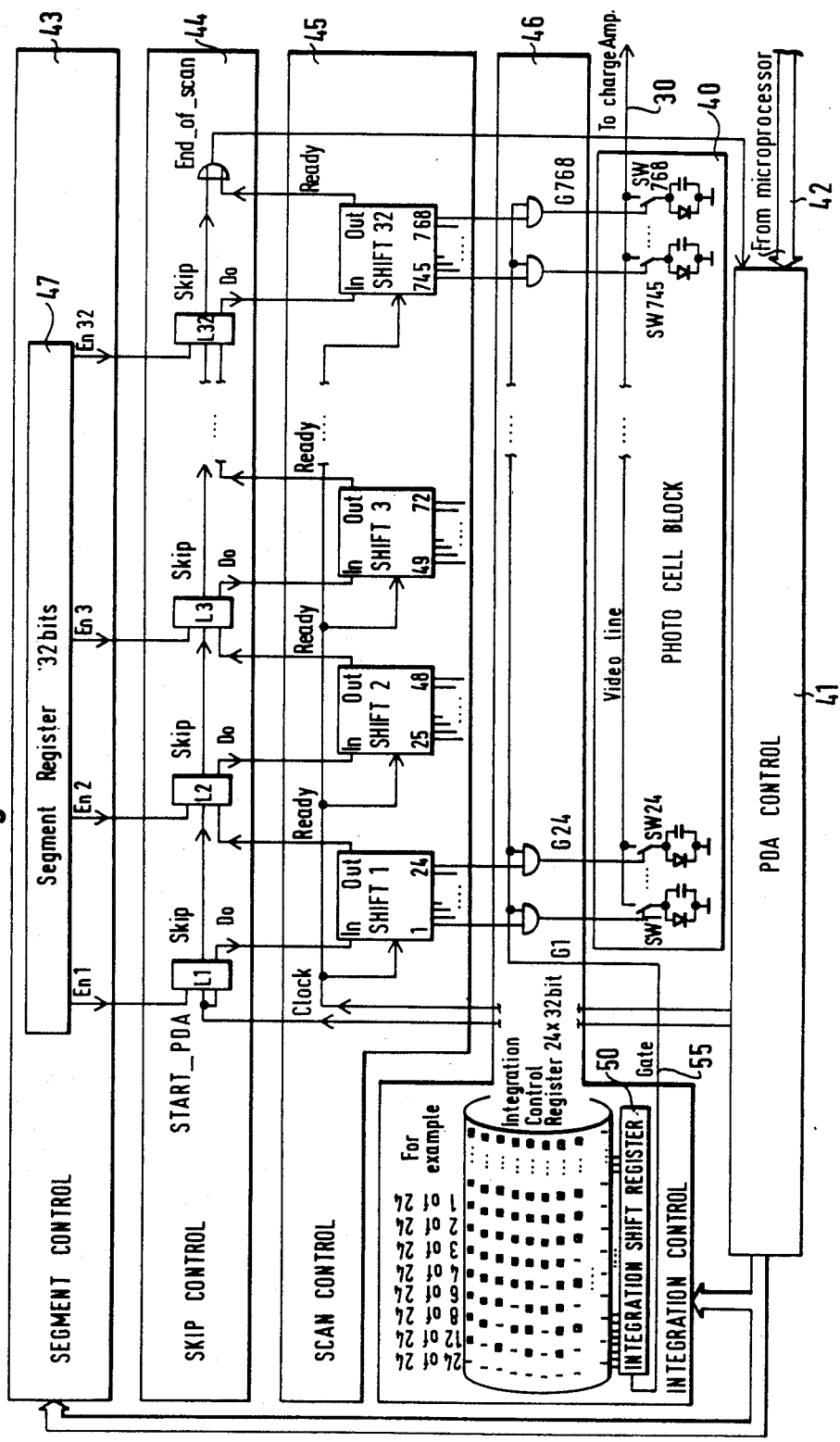

FIG. 3 shows in more detail an embodiment of the switch control circuit of a photodiode array according to the invention.

FIG. 1 schematically shows a photodiode array spectrometer which allows measurement of the absorption of a polychromatic beam of ultraviolet and/or visible radiation by a sample to be analysed. The spectrometer comprises a light source 1, e.g., a deuterium lamp, which emits a beam 2 of polychromatic radiation. The beam 2 is focused by a lens system 3 into a sample cell 5. The lens system preferably is an achromatic system which ensures that rays of different wavelengths substantially have the same focal point. A shutter 4 is provided which permits to interrupt the light beam 2 in order to measure the dark signal at the photodiodes of the photodiode array 11. In the actual measuring process wherein the beam 2 passes through the sample cell 5, the dark signal and other electronic offset signals are subtracted from the measuring values to compensate for any measuring errors.

The sample cell 5 may comprise an inlet and an outlet through which a sample liquid to be analysed flows continuously. Such a spectrometer can be used, for example, in a liquid chomatograph wherein the inlet is connected to the chromatographic separation column from which sample substances are continuously eluting.

The polychromatic radiation entering the sample cell 5 is partially absorbed by the substances in the cell, whereby, depending on the sample substances, rays of certain wavelengths are absorbed more strongly than rays of other wavelengths. As a result thereof, the beam leaving the cell has a different spectral composition than the beam entering the cell and the resulting spectrum thus contains information about the kind of substances in the cell and about their quantities.

The beam leaving the cell impinges on a holographic diffraction grating 10 which disperses the light according to the different wavelengths in the beam impinging on it. The spatially separated light rays from the grating 10 impinge on a photodiode array 11, which consists of a plurality of individual light-sensitive diodes 15, 16, etc., which are separated by light-insensitive gaps. Each of the photodiodes intercepts a specific spectral portion of the diffracted radiation.

The photodiode array 11 is connected to a read-out circuit 20 for periodically reading out electrical signals from photodiodes, whereby these signals are indicative of the intensity of the light signals impinging on the photodiodes, respectively. Details of the read-out circuit 20 are explained below with reference to FIGS. 2 and 3. The electrical signals read out from the photodiode array 11 are then further processed in a signal processing circuit 21 which typically comprises an analog-to-digital converter and circuitry for storing and further processing these digital values. The operation of the array read-out circuit 20 and the signal processing circuit 21 is controlled by a controller 23, typically comprising a microprocessor, which also controls the operation of a display means 22 for displaying the final spectrum of the analyzed sample. The signal processing circuit 21 may also comprise circuitry for correcting the electrical signals from the individual photodiodes regarding the above-mentioned dark currents of the photodiodes and for other effects.

FIG. 2 schematically shows the photodiode array 11 comprising a plurality of n individual photodiodes 1, . . . , n forming part of a semiconductor chip. Each photodiode has an associated capacitor $C_{d1}$, . . . , $C_{dn}$ which represents the junction capacitance of the photodiodes, or, in applications where a separate capacitor is switched in parallel to the photodiodes, the sum of this capacitor and the junction capacitance. The photodiodes and the associated capacitor will also be referred to as photocells Cell 1, Cell 2, . . . , Cell n. The cells 1 . . . n are connected to a common video line 30. The electrical connections between the individual cells and the video line can be interrupted by means of electronic switches SW1 . . . SWn, respectively. The switches are controlled by a switch control circuit 31. The switch control circuit is explained in more detail below with reference to FIG. 3.

The video line 30 is connected to a charge amplifier 32 which is designed as an integrator comprising an operational amplifier with a capacitor $C_{int}$ in the feedback loop. The non-inverting input of the operational amplifier is connected to the signal $U_{guard}$ which has a fixed potential of, for example, $-5$ V. Thus, the inverting input (video line) virtually has the same potential. A reset switch $R_s$ across the capacitor $C_{int}$ is closed before each charge transfer to reset the integrator.

In operation, the capacitors of selected photocells are initially charged to a fixed value. When photons are penetrating the photosensitive material, charge carriers are generated which discharge the capacitors corresponding to the amount of photons received within a given integration period. These capacitors are periodically recharged in further scan sequences. The discharge level of each individual capacitor is proportional to the incident light intensity during the integration period.

The amount of charge transferred hereby causes a voltage change at the output of the charge amplifier 32 which is proportional to the integral of the incident light level during the integration period. The output signal of the charge amplifier 32, the "PDA signal", can now be further processed by additional circuits (not shown), for example, by an amplification circuit, sample and hold circuit, A/D converter and microprocessor. Before each charge transfer from the charge amplifier to a cell, the "reset switch" is closed to reset the charge amplifier 32 in preparation for the next charge transfer.

In the following, an embodiment of the switch control circuit 31 (FIG. 2) is explained in detail with reference to FIG. 3. In FIG. 3, the cells and the associated switches are shown to be arranged in a photocell block 40. According to an embodiment of the invention, a total number of 768 cells is provided arranged in 32 groups or segments with each segment comprising 24 cells. Each of these cells is connected via an electronic switch SW to a common video line 30 connected to the charge amplifier 32 (FIG. 2).

The switch control circuit is divided into several units, illustrated in FIG. 3 as blocks 41, 43, 44, 45, 46. The photodiode array control unit 41 has an input connected via a bus line 42 to a microprocessor (not shown). The output of the photodiode array control unit 41 is connected to a segment control unit 43 and an integration control unit 46. The segment control unit 43 is connected via a plurality of lines En1 ... En32 to the skip control unit 44 which in turn is connected to a scan control unit 45. A plurality of output lines of the scan control unit 45 is connected to the integration control unit 46 which has a number of output lines corresponding to the number of electronic transfer switches SW1 . . . SW768 of the photo cell block 40. Subsequently, the individual units are described in more detail.

The segment control unit 43 substantially comprises a segment register 47 for storing a digital control word having a length of, for example, 32 bits. This control word determines the segmentation of the photodiode array, i.e., which segments are activated during a scan and which are not. In the present example, with a control word of 32 bits, the array is divided into 32 segments and the sequence of "1"s and "0"s in the control word determines which segment is active and which is inactive. The 32 bit control word is initially written into the segment register 47 under control of the microprocessor and the photodiode array control unit 41.

The skip control unit 44 comprises a plurality of logic circuits L1, ..., L32, the number of which corresponds to the number of output lines En1, ..., En32 of the segment register 47. Each logic circuit has three input lines, one of which is an output line Eni of the segment register (whereby i may be any number between 1 and 32), and two output lines designated as "Skip" and "Do". Besides the line Eni, the two other input lines of a logic circuit Li are the line carrying the "Skip" signal from the previous logic circuit Li−1 and the line carrying the "Ready" signal from the circuit "Shift i−1" which is explained in more detail below. For the first logic circuit L1, the two input lines besides the line En1 are connected to the photodiode array control block 41 and carry the START-PDA signal.

The scan control unit 45 comprises a plurality of circuits SHIFT 1, ..., SHIFT 32, the number of which corresponds to the number of segments of the photodiode array, i.e., 32 in the present example. In an embodiment of the invention, each of the circuits SHIFT i is a serial shift register having 24 stages, whereby each stage has an output connected to a photocell via a logic gate in block 46 (see below). An input "In" of a circuit SHIFT i is connected to the output of the logic circuit Li carrying the "Do" signal. An output "Out" of a circuit SHIFT i is connected to a logic circuit Li+1 for providing a "Ready" signal to the logic circuit Li+1. Furthermore, each of the circuits SHIFT i is connected to a line carrying the clock signal supplied by the photodiode array control block 41.

The integration control unit 46 comprises a number of logic AND gates G1, ..., G768 corresponding to the number of photocells. Each AND gate has two input lines, one of the two being connected to one of the 768 output lines of the scan control block 45 and the other being connected to a common line 55 designated as "Gate" line which is connected to a shift register 50, subsequently referred to as integration shift register. The output signal of each of the AND gates G1, ..., G768 is connected to a transfer switch SW1, ..., SW768, respectively. The integration control unit 46 further comprises a rolling register set having a word length of 32 bit according to the number of segments into which the photodiode array is divided and a depth of 24 words. At the beginning of each new scan of the array, a new word is loaded into the integration shift register 50 which is later on read out serially via the "Gate" line 55. After the last word has been loaded into the integration shift register, then, in the next scan, the first of the 24 words is again loaded into the shift register.

In the following, the operation of the circuitry shown in FIG. 3 is explained. The operation of the circuitry is controlled by digital signals having two states which are referred to as logic "1" and logic "0". A logic "1" on an output line Eni of the segment register 47 causes the corresponding circuit Li to generate a "Do" signal which is supplied to the circuit SHIFT i. As a consequence of the logic "1" at the input of the circuit SHIFT i, a logic "1" is successively generated on each of the 24 output lines of SHIFT i in accordance with the frequency of the "Clock" signal supplied by the photodiode array control unit 41. In response to the logic "1" on the output lines of the circuit SHIFT i and if the "Gate" line 55 carries a logic "1" (enable-signal), the corresponding transfer switches of the photodiode array are sequentially closed so that the associated photocells are read out. After a logic "1" has successively been applied on all 24 output lines of the circuit SHIFT i, a "Ready" signal is supplied to the logic circuit Li+1 acting as a start signal for the next segment. If a logic "1" is supplied to the logic circuit Li+1 on line Eni+1, the transfer switches associated with the circuit SHIFT i+1 are activated in the manner just described in connection with the previous segment.

If a logic "0" is applied on a line Enj of the segment register (whereby j may be any number between 1 and 32), the associated logic cell Lj provides a "Skip" signal which is directly supplied to the input of the next logic cell Lj+1. In this case, the segment SHIFT j is skipped and the associated transfer switches remain opened. If the signal Enj+1 is a logic "1", then a "Do" signal is provided to the segment SHIFT j+1 and the associated transfer switches are successively activated. If the signal Enj+1 is a logic "0", then the segment SHIFT j+1 is also skipped.

When the last segment, in the present example the circuit SHIFT 32, has been scanned and has emitted a "Ready" signal or, alternatively, when the circuit L32 has emitted a "Skip" signal in response to a logic "0" on line En32, a signal indicating the end of a scan is supplied to the photodiode array block 41. Thereafter, a new scan can start.

As already mentioned, the activation of the transfer switches is determined by the "Gate" signal on the line 55 in addition to the signals on the output lines of the circuits SHIFT i. The signal on the "Gate" line, either logic "0" or logic "1" is determined by the last bit of the integration shift register 50 (most left position in FIG. 3). During a scan, each time a new segment is started, i.e., when a "Do" signal has been emitted, the contents of the integration shift register is shifted by one bit such that a new bit is supplied to the "Gate" line. If the bit supplied to the "Gate" line is "0", the signal on this line acts as a disable signal such that none of the transfer switches associated with the presently activated segment is closed, even if an output line of the corresponding circuit SHIFT i has a logic "1". If the bit supplied to the "Gate" line is "1", the signal acts as an enable signal which permits the transfer switches associated with the presently activated segment SHIFT i to be closed provided the signal Eni is logic "1".

During a scan, n of the 32 bits contained in the integration shift register are thus successively supplied to the "Gate" line, whereby n corresponds to the number of selected segments, i.e. the number of logic "1"'s contained in the segment register 47. In the embodiment shown wherein the bits of the integration shift register are shifted to the left onto the "Gate" line, the left-most bit of the 32 bit word in the shift register enables or disables the first selected segment and the $n^{th}$ bit enables the last of the selected segments, i.e. the right-most segment to be activated. The bits n+1 through 32 are not used. The PDA control block 41 takes care that the integration shift register 50 is loaded with the content of a row of the rolling register set in the right order according to the sequence of the selected segments. Once a scan is finished, the next 32 bit word is loaded into the integration shift register. Since there are 24 words, the procedure is repeated 24 times and then it starts again with the first word.

It is important that the total time needed for one scan (scan time) only depends on the number of segments selected and the clock rate, whereas the scan time does not depend on how often the "Gate" signal is enabled or disabled during a scan.

By appropriate selection of the words in the rolling register set, the number of times each segment is read out during 24 scans can be adjusted. If, according to a practical example, the numbers indicating how often a segment can be read out during 24 scans are 24, 12, 8, 6, 4, 3, 2, and 1, the integration times of the segments, i.e. the times during which the photocells of a segment are not read, can be adjusted, whereby the available integration times are the following multiples of the basic scan time: 1, 2, 3, 4, 6, 8, 12, 24.

According to an embodiment of the invention, a start-up procedure can be implemented for determining the contents of the rolling register set, in particular in spectrometric applications. According to this start-up procedure, the light intensities incident on the various photodiodes of the photodiode array are measured without the sample to be analyzed being present in the sample cell. Depending on the measured light intensities, the distribution of "0"'s and "1"'s in the rolling register set is determined such that segments receiving higher light intensities would be read out more often than segments receiving lower light intensities. Consequently, for segments receiving lower light intensities there will be more "0"'s in the corresponding column of the rolling register set than for segments receiving higher light intensities.

According to a practical embodiment of the invention, the photodiode array and associated control circuitry shown in FIG. 3 is used in a spectrophotometer which covers a spectral range from 190 nm to 950 nm. With the 768 photocells, a spectral resolution of 1 nm is achieved. Assuming that only one eighth of the available segments are addressed for a specific application, i.e., for spectrometric determination of a specific sample, the data rate can thus be reduced by a factor of 8 as compared to a conventional self-scanning photodiode array. Furthermore, with a given data rate, the light throughput can be increased by the same factor which will improve the signal/noise ratio and therefore the sensitivity by a factor of approximately 3. A complete spectrum over the total spectral range is acquired in this mode by doing several scans with different segments.

It is understood that the invention is not limited to an absorption detector as described in the embodiment of FIG. 1 but that it can also be used, for example, in a fluorescence detector or in an atomic emission detector.

It is furthermore understood that the invention can advantageously be used for analysing the spatial distribution of a beam of radiation, whereby it is not necessary that the spatial components of the beam impinging on the photodiode array have different wavelengths. The advantages of the invention, for example the reduction of the data rate, are also achieved in applications where the light rays impinging on different photodiodes have the same wavelength.

I claim:

1. Spectrometer for determining the spectral composition of a polychromatic beam of radiation, comprising:
    an array of photosensitive elements (1, 2, ..., n) with each element intercepting a different wavelength range of the polychromatic beam of radiation,
    a plurality of transfer switches (SW1, ..., SWn), each switch being connected to a photosensitive element, having a control input terminal for controlling the opening and closing of the switch, and having an output terminal, and
    read-out circuitry connected to the transfer switches for opening or closing the transfer switches and for generating during a read-out cycle signals indicative of the amount of radiation intercepted by the photosensitive elements,
    characterized in that the read-out circuitry comprises a switch control circuit (41,43,44,45,46) which is designed for controlling the transfer switches (SW1, ..., SWn) in selectable groups (SW1-SW24; SW25-SW48; ...) of switches such that during a read-out cycle only selected groups of photosensitive elements (1-24; 25-48; ... n) are read out, with such selected groups comprising less than the whole array of photosensitive elements.

2. Spectrometer according to claim 1, further characterized in that
    said switch control circuit comprises a scan control unit (45) having a number n of segment circuits (SHIFT 1, ..., SHIFT n) corresponding to said number n of photosensitive elements, each segment circuit (SHIFT 1) comprises an input line (Do) for transmitting a signal indicative of whether the corresponding group of photosensitive elements is to be read out or not, and further comprises an output line connected to said control input terminal of said associated transfer switch of said photosensitive element array for controlling the opening or closing of said switches in response to the signal on the input line of the segment circuit.

3. Spectrometer according to claim 2, further characterized by a digital segment register (47) coupled to said scan control unit (45) for storing a digital word, the number of bits of this word corresponding to the number of said groups of said transfer switches and each bit indicating if said corresponding group of photosensitive elements is to be read out.

4. Spectrometer according to claim 2, further characterized by an integration control unit (46) that is coupled to said output lines of said segment circuits (SHIFT 1, ... , SHIFT n) for the selectable enabling and disabling of the activation of said transfer switches (SW1, ... SWn).

5. Spectrometer according to claim 4, further characterized in that said integration control unit comprises:

a rolling register set containing a plurality of digital words, the number of bits of each word corresponding to the number of said groups of photosensitive elements, an integration shift register (50) having inputs coupled to the rolling register set for receiving a digital word and an output coupled to a gate line (55), and a plurality of AND gates (G1, ... , Gn), each AND gate (Gj) having a first input connected to an output of a segment circuit (SHIFT j), a second input connected to the gate line (55), and an output coupled to a transfer switch (SWi).

6. Spectrometer according to claim 3, further characterized by an integration control unit (46) that is coupled to said output of said segment circuits (SHIFT1, ... , SHIFTn) for the selectable enabling and disabling of the activation of said transfer switches (SW1, ... , SWn).

7. Spectrometer according to any of claims 1-5, or 6, further characterized in that the output terminals of said transfer switches (SW1, ... , SWn) are connected to a common video line (30) which is connected to a charge amplifier circuit for transferring electric charges to a photosensitive element when said associated transfer switch is closed, thus causing a voltage change at the output of the charge amplifier circuit, the voltage change being proportional to the amount of light which has impinged on said photosensitive element since the previous opening of said associated transfer switch.

8. Spectrometer according to any of claims 1-5, or 6, further characterized by a radiation source (1) for emitting a beam (2) of radiation, a sample cell (5) for receiving the beam of radiation, with the beam leaving the sample cell being modified by sample substances in the sample cell, a wavelength dispersive element for receiving the beam leaving the sample cell (5) and for generating an outgoing beam comprising a plurality of spatially separated rays of different wavelengths which are directed on said photosensitive element array (11).

* * * * *